United States Patent
Lee et al.

(10) Patent No.: US 12,257,887 B2
(45) Date of Patent: Mar. 25, 2025

(54) STRUCTURE OF FLAP PART FOR COVERING RAIL PART WHEN OPENING SLIDING DOOR OF VEHICLE

(71) Applicants: Hyundai Motor Company, Seoul (KR); Kia Corporation, Seoul (KR); Duck Yang Industry Co., Ltd., Ulsan (KR)

(72) Inventors: Jae-Seung Lee, Hwaseong-si (KR); Chung-Sik Yim, Anyang-si (KR); Yong-Hyun Nam, Anyang-si (KR); Kyu-Hoon Cho, Suwon-si (KR); Gwang-Seob Kim, Suwon-si (KR)

(73) Assignees: HYUNDAI MOTOR COMPANY, Seoul (KR); KIA CORPORATION DUCK YANG INDUSTRY CO., LTD., Ulsan (KR)

( * ) Notice: Subject to any disclaimer, the term of this patent is extended or adjusted under 35 U.S.C. 154(b) by 323 days.

(21) Appl. No.: 17/862,747

(22) Filed: Jul. 12, 2022

(65) Prior Publication Data
US 2023/0118226 A1      Apr. 20, 2023

(30) Foreign Application Priority Data

Oct. 19, 2021   (KR) .................. 10-2021-0139591

(51) Int. Cl.
*B60J 5/06*      (2006.01)
*E05D 15/10*     (2006.01)
*B62D 25/02*     (2006.01)
*E05D 15/06*     (2006.01)

(52) U.S. Cl.
CPC .............. *B60J 5/06* (2013.01); *E05D 15/101* (2013.01); *B62D 25/02* (2013.01); *E05D 15/0621* (2013.01)

(58) Field of Classification Search
CPC ................................. B60J 5/06; E05D 15/101
USPC ......................................................... 296/155
See application file for complete search history.

(56) References Cited

U.S. PATENT DOCUMENTS

| | | | | |
|---|---|---|---|---|
| 5,676,417 | A | * | 10/1997 | Olivier .................. B60J 5/06 296/155 |
| 7,261,364 | B2 | * | 8/2007 | Tanigawa ................ B60J 5/06 296/155 |
| 11,725,448 | B2 | * | 8/2023 | Choi .................. E05F 15/655 49/362 |

FOREIGN PATENT DOCUMENTS

| | | | | |
|---|---|---|---|---|
| EP | 1512566 | A1 * | 3/2005 | ............ B60J 5/06 |
| KR | 2005037132 | A * | 4/2005 | ........ B60J 5/0415 |
| WO | WO-2020117147 | A2 * | 6/2020 | ............ B60J 5/06 |

OTHER PUBLICATIONS

Machine translation of KR2005037132 (Year: 2024).*

* cited by examiner

*Primary Examiner* — Jason S Morrow
(74) *Attorney, Agent, or Firm* — Morgan, Lewis & Bockius LLP

(57) ABSTRACT

A structure of a flap part for covering a rail part when opening a sliding door of a vehicle, includes a door flap part including an installation hole, a door flap guide, door trim flap links, elastic members, and a flap, wherein the sliding door is supported by a roller arm, and the rail part, which is externally exposed when the sliding door is opened, is covered by the flap part, and wherein at a time of opening the door, a roller provided on the roller arm comes into contact with a door flap guide and pushes the door flap guide to ensure a movement space for the roller arm.

16 Claims, 6 Drawing Sheets

DOOR OPENING DIRECTION

DOOR OPENING DIRECTION

STRUCTURE OF FLAP PART FOR COVERING RAIL PART WHEN OPENING SLIDING DOOR OF VEHICLE

CROSS-REFERENCE TO RELATED APPLICATIONS

The present application claims priority to Korean Patent Application No. 10-2021-0139591, filed on Oct. 19, 2021, the entire contents of which is incorporated herein for all purposes by this reference.

BACKGROUND OF THE PRESENT DISCLOSURE

Field of the Present Disclosure

The present disclosure relates to a structure of a flap part for covering a rail part when opening a sliding door of a vehicle. More particularly, the present disclosure relates to a structure of a flap part for covering a rail part when opening a sliding door of a vehicle, in which a center rail is positioned adjacent to a door to prevent the center rail from being exposed and minimize a protrusion degree of a flap part that covers a rail part exposed when opening the door.

Description of Related Art

In general, a vehicle has an occupant compartment having a predetermined size in which a driver or an accompanied occupant may be accommodated, and occupant compartment opening/closing doors are provided on a vehicle body to open or close the occupant compartment.

Sliding type occupant compartment opening/closing doors include a front sliding door provided at a front side in a longitudinal direction of a vehicle and a rear sliding door provided at a rear side in the longitudinal direction of the vehicle. The front sliding door and the rear sliding door are typically provided to be moved along rails mounted on a vehicle body or the doors.

In general, as illustrated in FIG. 1A and FIG. 1B, a sliding door 1 in the related art has an upper end rail 10 provided on an upper portion of a vehicle, a lower end rail 20 provided on a lower portion of the vehicle, and a center rail 30 provided on a middle portion of a vehicle body.

That is, the center rail 30 provided on the vehicle body is directly exposed to an external appearance, which impairs an aesthetic appearance. Foreign substances such as dust are introduced into the exposed portion, which causes operational noise when opening or closing the door. Furthermore, the foreign substances are consistently introduced into the exposed portion, which causes an operational defect of the door.

For example, the introduced foreign substances are bonded to oil components (grease which is machine lubricating oil) for operating the door and thus burned, which causes a problem in opening or closing the door over time.

Therefore, to solve the above-mentioned problem, an improved sliding door 1 illustrated in FIG. 2A has been provided.

In this invention, the center rail 30 is provided on the vehicle body, preventing the rail part from being exposed to the external appearance in a state in which the door is closed. However, there is a problem in that the rail part 40 is exposed in a state in which the door is opened.

To solve the present problem, a flap part 40 is provided, as illustrated in FIG. 2B.

A structure of the flap part 40 includes a door trim flap 41 (hereinafter, referred to as a 'flap') configured to be opened by a roller arm 50 that operates as a door is opened, an arm 42 provided in the flap 41 and configured to fix the flap 41 so that the flap 41 is openable or closable, a rotation shaft P configured to maintain a pivoted state of the arm 42, and a bracket 43 configured to support the rotation shaft P.

The flap 41 configured as described above is opened or closed by a rotational operation of the single hinge shaft P fixed to the bracket 43.

The arm 42 has an approximately "¬" shape and rotates about the rotation shaft P. In the instant case, because the arm 42 has a "¬" shape, a rotation radius of the arm 42 is excessively large, which causes a problem of an excessive protrusion degree l of the flap 41, as illustrated in FIG. 2C, when the sliding door is opened.

As described above, when the flap 41 is excessively opened, there is a problem in that the flap 41 interferes with a fender.

Non-described reference numeral 51 in the drawings indicates a roller.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a structure for minimizing a protrusion degree of a flap part for covering a rail part of a sliding door when the door is opened and the rail part is exposed to an external appearance.

The present disclosure, in various aspects thereof, has also been made in an effort to minimize an opening protrusion degree of a sliding door by disposing the rail part adjacent to the door and configuring a flap part with a dual shaft structure.

The present disclosure, in various aspects thereof, has also been made in an effort to open a door rail part by moving a flap in a kick-up manner (in a vertical direction) by bringing a roller arm and a flap guide into contact with each other when opening a door.

The above-mentioned objects and other objects of the present disclosure all may be achieved by the present disclosure to be described below.

To achieve the above-mentioned objects, various aspects of the present disclosure are directed to providing a flap structure in which an upper end rail part, a center rail part, and a lower end rail part are provided on a vehicle body on which a sliding door is provided, the sliding door is supported by a roller arm that operates along the rails, and the center rail part, which is externally exposed when the sliding door of the vehicle is opened, is covered by a flap part. A center rail part is positioned on a door trim provided adjacent to the door. At the time of opening or closing the door, a roller provided on a roller arm comes into contact with a door flap part and pushes the door flap part to ensure a movement space for the roller arm. An inclined surface is formed at one end portion of a door flap guide which is in contact with the roller, and the flap part is opened as the roller of the roller arm pushes the inclined surface. The door flap part includes: an installation hole positioned at a position facing the center rail and elongated in a direction of the center rail: door trim flap links formed at an equal interval in the installation hole and each including first and second shaft fixing portions and provided at two opposite end portions thereof: first and second rotation shafts and rotatably provided on the first and second shaft fixing portions and; and an elastic member provided between the second shaft fixing portion and the second rotation shaft and configured to provide a position restoring force to a flap. The first shaft fixing portion is fixed, by the first rotation shaft, to a bracket a provided inside a door trim, and the second shaft fixing portion is rotatably provided on the flap by the second rotation shaft. The first shaft fixing portion is fixed, by the first rotation shaft, to the bracket a provided inside the door trim, and the second shaft fixing portion is rotatably provided on the door trim flap by the second rotation shaft.

It is possible to obtain the following effects from the structure of the flap part for covering the rail part when opening the sliding door of the vehicle according to an exemplary embodiment of the present disclosure configured as described above.

First, the route of the sliding rail passing through the center portion is positioned on the door trim, which makes it possible to prevent the rail part of the sliding door from being exposed to the external appearance.

Second, the rail part is provided adjacent to the door, and the flap part is configured with the dual shaft structure, which makes it possible to minimize the protrusion degree of the flap that covers the rail part when the door is opened.

Third, at the time of opening or closing the door, it is possible to open or close the door rail part by moving the flap in the vertical direction with the contact between the roller arm and the flap guide.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 1A and FIG. 1B are views exemplarily illustrating an installation position of a rail part of a structure of a sliding door Generally, in which FIG. 1A is a view exemplarily illustrating the sliding door in a closed state, and FIG. 1B is a view exemplarily illustrating the door in an opened state.

FIG. 2A, FIG. 2B and FIG. 2C are views schematically illustrating a structure of an improved sliding door Generally, in which FIG. 2A is a view exemplarily illustrating a position of a center rail on which the sliding door is provided, FIG. 2B is a cross-sectional view exemplarily illustrating a state of a flap part when the door is in a closed state, and FIG. 2C is a cross-sectional view exemplarily illustrating a state of the flap part when the door is in an opened state.

FIG. 3A and FIG. 3B are views exemplarily illustrating a state in which a structure of a flap part for covering a rail part when opening a sliding door of a vehicle according to an exemplary embodiment of the present disclosure is used, in which FIG. 3A is a cross-sectional view exemplarily illustrating a state of the flap part when the door is in a closed state, and FIG. 3B is a cross-sectional view exemplarily illustrating a state of the flap part when the door is an opened state.

FIG. 5A and FIG. 5B are views exemplarily illustrating a process of opening the sliding door of the vehicle according to an exemplary embodiment of the present disclosure, in which FIG. 5A is a view exemplarily illustrating a state immediately before a roller pushes a flap guide, and FIG. 5B is a view exemplarily illustrating a state in which a flap is raised as the roller pushes the flap guide.

FIG. 6A is a view exemplarily illustrating a state before the door is opened, FIG. 6B is a view exemplarily illustrating a process in which the door is opened, and FIG. 6C is a view exemplarily illustrating a state in which the door is completely opened.

Figure 1A:
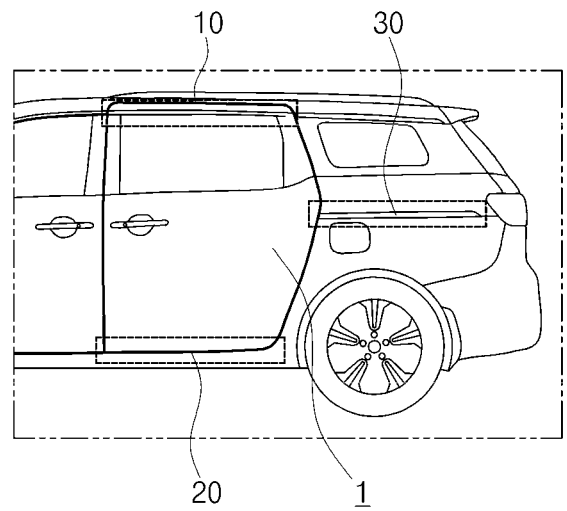
Figure 1B:
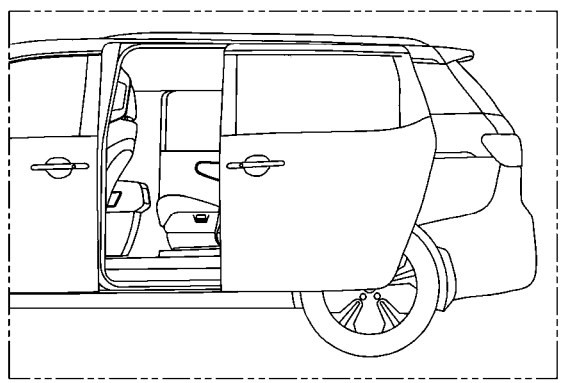

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, the present disclosure will be described in detail with reference to the accompanying drawings so that those skilled in the technical field of the present disclosure to which an exemplary embodiment of the present disclosure pertains may easily carry out the present disclosure. However, the present disclosure may be implemented in various different ways and is not limited to the exemplary embodiments described herein.

A part irrelevant to the description will be omitted to clearly describe the present disclosure, and the same or similar constituent elements will be predetermined by the same reference numerals throughout the specification.

Furthermore, terms or words used in the specification and the claims should not be interpreted as being limited to a general or dictionary meaning and should be interpreted as a meaning and a concept which conform to the technical spirit of the present disclosure based on a principle that an inventor can appropriately define a concept of a term to describe his or her own invention by the best method.

Hereinafter, according to an exemplary embodiment of the present disclosure will be described in detail with reference to the accompanying drawings.

Figure 2A:
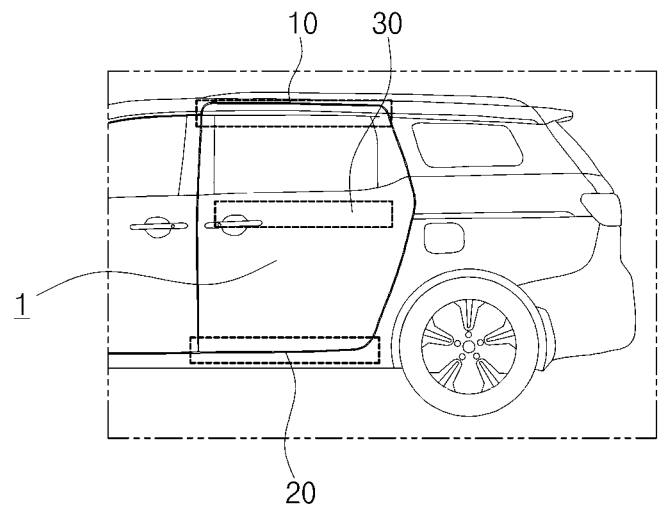
Figure 2B:
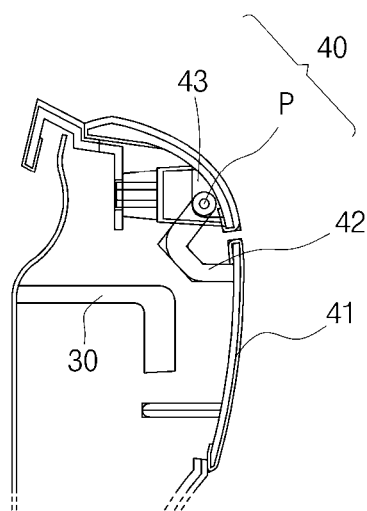
Figure 2C:
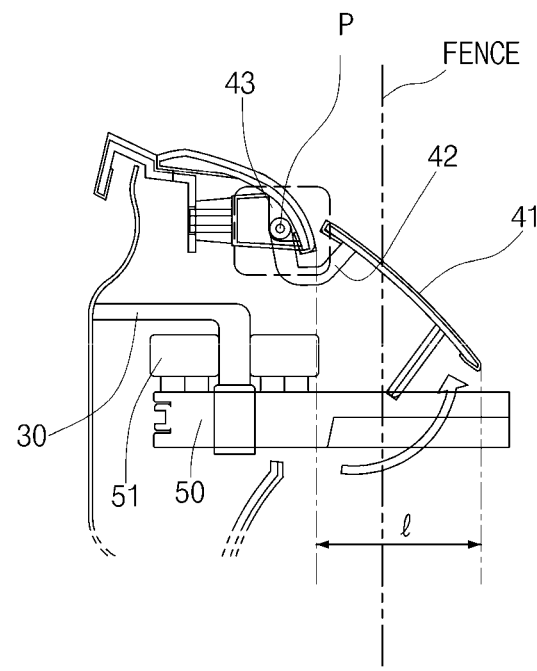

Various embodiments of the present disclosure relates to a structure of a flap part for covering a rail part when opening a sliding door of a vehicle. As illustrated in FIG. 2A, the structure of the flap part is basically identical or similar to the structure of the flap part in the related art in that a sliding door 1 includes an upper end rail part 10, a center rail part 30, and a lower end rail part 20 provided on a vehicle body on which the sliding door 1 (hereinafter, referred to as a 'door') is provided, the door 1 is supported by a roller arm 50 that operates along the rails, and the center rail part 30, which is externally exposed when the door 1 of the vehicle is opened, is covered by the structure of the flap part.

However, the present disclosure is directed to providing a structure configured for preventing the flap part in the related art from excessively protruding (having an excessive opening trajectory) when the door is opened.

To solve the problem of the flap structure in the related art caused by the configuration in which the flap rotates about the single hinge shaft, the present disclosure adopts a link structure in which a flap part rotates about two shafts to minimize a protrusion degree of the flap part when the door is opened.

Figure 4:
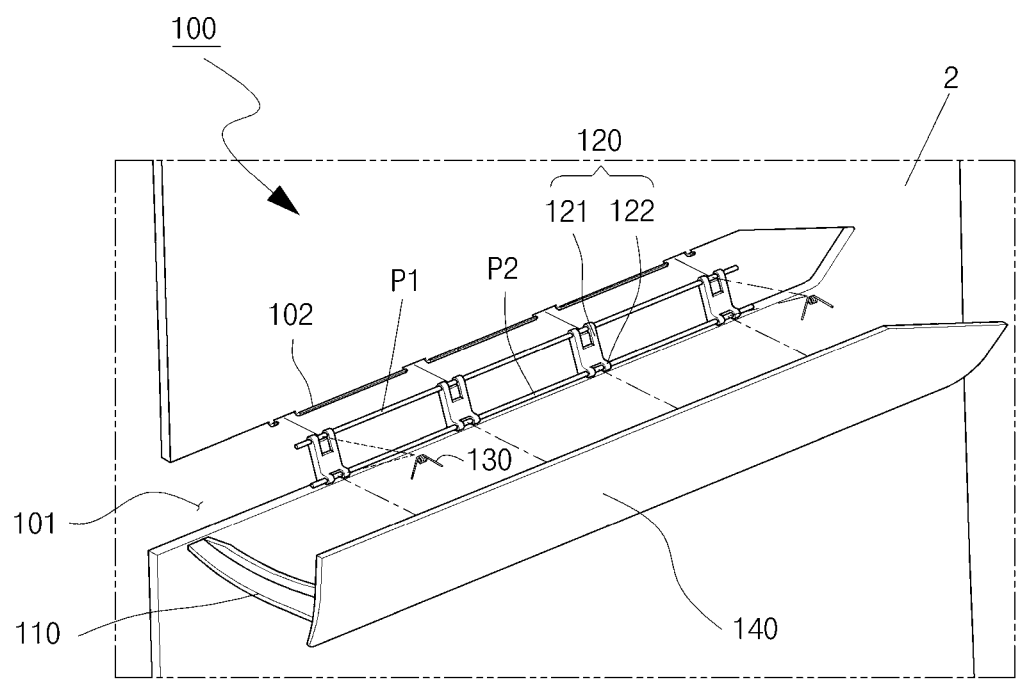
FIG. 4 is a view exemplarily illustrating a state in which the flap part for covering the rail part when opening the sliding door of the vehicle according to an exemplary embodiment of the present disclosure is disassembled.

To implement the link structure, as illustrated in FIG. 4, a door flap part 100 according to an exemplary embodiment of the present disclosure includes an installation hole 101, a door flap guide 110, door trim flap links 120 (hereinafter, referred to as 'flap links'), elastic members 130, and a flap 140.

For example, the installation hole 101 is positioned at a position facing a door trim 2, i.e., the center rail 30 and elongated in a direction of the center rail 30.

A plurality of hinge fixing portions 102 is provided at a lower end of an upper portion of the installation hole 101 and formed at an equal interval in a longitudinal direction thereof.

A rotation shaft P1, which is provided on the flap links 120 to be described below, is rotatably inserted and provided on the hinge fixing portions 102 formed in the installation hole 101.

That is, as illustrated in FIG. 3, the hinge fixing portions 102 and the flap links 120 are connected by the rotation shaft P1.

Meanwhile, the plurality of flap links 120, which is provided in the installation hole 101 at an equal interval, each has first and second shaft fixing portions 121 and 122 provided at two opposite ends thereof.

The first and second shaft fixing portions 121 and 122 each have an approximately "concave" shape. The first and second rotation shafts P1 and P2 are rotatably provided on the first and second shaft fixing portions 121 and 122.

In the instant case, the elastic members 130 are provided between the first and second shaft fixing portions 121 and 122 and the first and second rotation shafts P1 and P2 and are configured to restore the flap 140 to an original position thereof.

The first shaft fixing portion 121 is fixed, by the first rotation shaft P1, to a bracket 2a provided inside the door trim 2, and the second shaft fixing portion 122 is rotatably provided on the flap 140 by the second rotation shaft P2. The first shaft fixing portion 121 is fixed, by the first rotation shaft P1, to the bracket 2a provided inside the door trim 2, and the second shaft fixing portion 122 is rotatably provided on the door trim flap 140 by the second rotation shaft P2.

Meanwhile, as illustrated in FIG. 5, at the time of opening the door 1, a roller 51 provided on the roller arm 50 comes into contact with the door flap part 100 and pushes the door flap part 100 to ensure a movement space for the roller arm 50.

That is, an inclined surface 111 is formed on the door flap guide 110 which is in contact with the roller 51.

The inclined surface 111 has a gradient so that an area thereof increases from below to above.

Therefore, as the roller 51 pushes the inclined surface 111, the flap part 100 is opened while being raised upwards.

Therefore, the flap part for covering the rail part when opening the sliding door of the vehicle, which is configured as described above, operates as illustrated in FIG. 3, FIG. 4, FIG. 5 and FIG. 6.

Figure 6A:
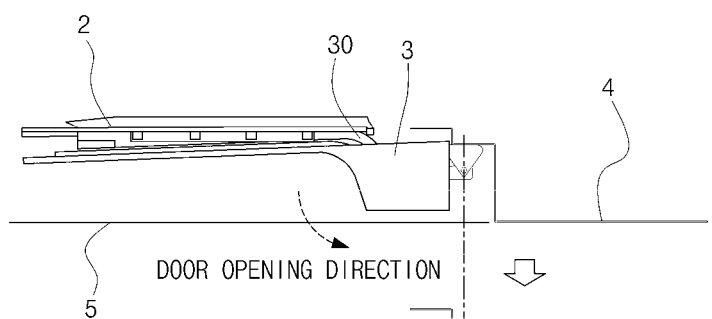
FIG. 6A, FIG. 6B, and FIG. 6C are views schematically illustrating a state when viewed from above to explain an operation of opening the sliding door.

When a driver or a passenger opens the door, the roller arm 50 provided at a center portion in the door 1 operates along the center rail 30, as illustrated in FIG. 6A.

Figure 5A:
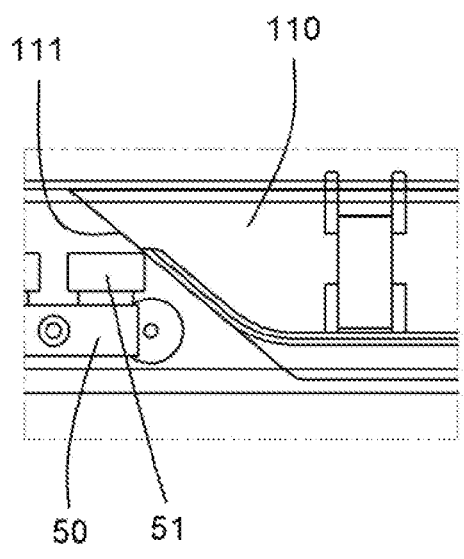
Figure 5B:
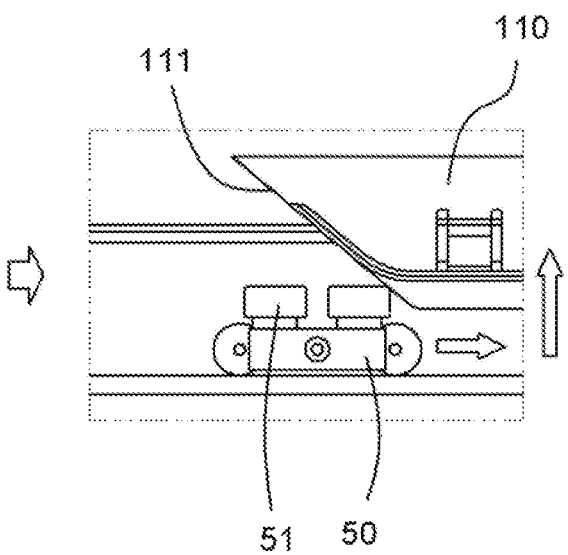

Accordingly, as illustrated in FIG. 5B, the roller 51 provided on the roller arm 50 pushes the inclined surface 111 of the door flap guide 110 so that the flap part 100 is opened while being raised upwards.

Figure 3A:
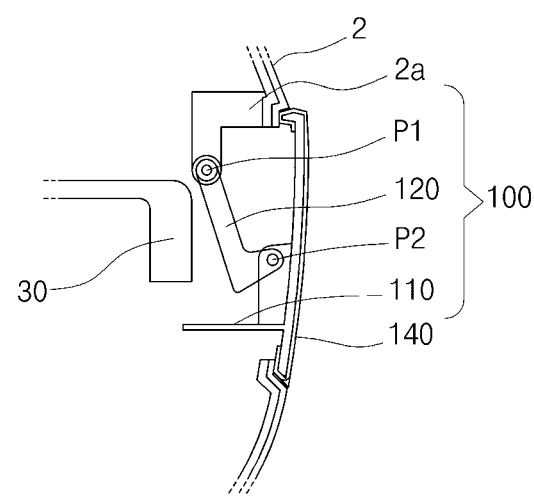
Figure 3B:
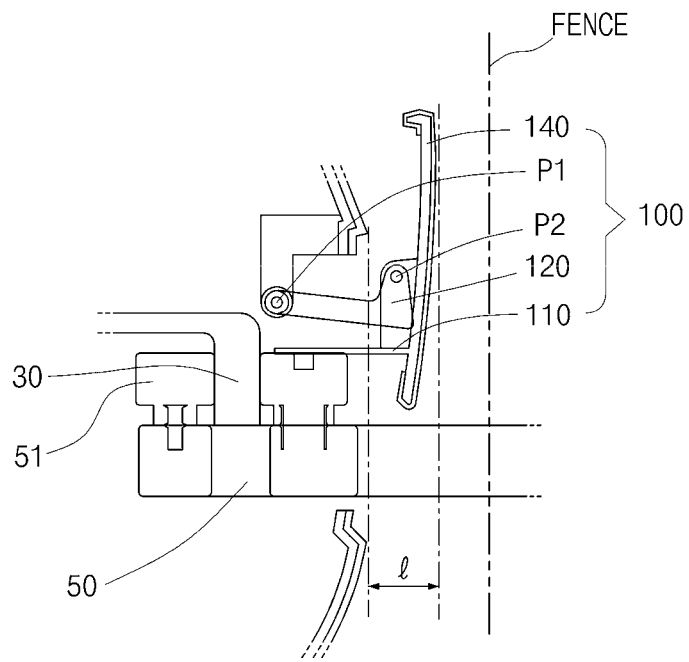

In the instant case, the flap part 100 is opened as the door trim flap links 120 rotatably provided on the first and second hinge shafts P1 and P2 are moved by 1 from the state illustrated in FIG. 3A to the state illustrated in FIG. 3B.

Figure 6B:
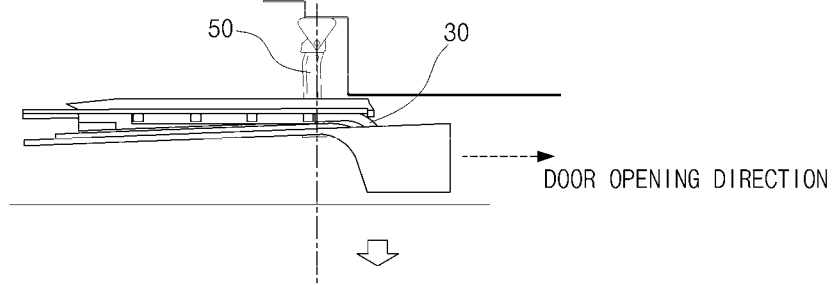

In more detail, as illustrated in FIG. 5A or 6A, the door 1 is kept in the closed state, i.e., the trim flap link 120 is kept fixed to the first and second hinge shafts P1 and P2. As illustrated in FIG. 5B, when the door 1 is opened, the roller 51 provided on the roller arm 50 rotates while moving along the rail 30 and comes into contact with a side external panel as illustrated in FIG. 6B.

Figure 6C:
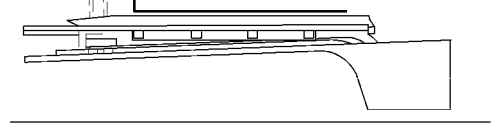

Next, when the door is fully opened, the door is opened as illustrated in FIG. 6C.

In the drawings, non-described reference numeral 3 indicates a door internal panel, non-described reference numeral 4 indicates the side external panel, and non-described reference numeral 5 indicates a door external panel.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A structure of a flap part for covering a rail part when opening a sliding door of a vehicle, the structure comprising:
    the flap part for covering the rail part;
    a roller arm for supporting the sliding door; and
    a door flap guide,
    wherein the rail part, which is externally exposed when the sliding door is opened, is covered by the flap part, wherein at a time of opening the sliding door, the roller arm is engaged to the door flap guide and pushes the door flap guide to ensure a movement space for the roller arm, wherein the flap part includes a flap, and wherein the door flap guide includes an inclined surface at one end portion of the door flap guide, and the inclined surface is engaged with the roller arm and the flap is opened when the roller arm pushes the inclined surface.

2. The structure of claim 1, wherein the roller arm including a roller, and wherein the roller of the roller arm contacts with the inclined surface of the door flap guide and pushes the inclined surface, and the flap is opened thereby.

3. The structure of claim 1, wherein the flap part further includes:

an installation hole positioned to face a center rail of the vehicle and elongated in a longitudinal direction of the center rail;

door trim flap links provided in the installation hole, wherein each of the door trim flap links includes first and second shaft fixing portions provided at first and second opposite ends thereof;

first and second rotation shafts rotatably provided on the first and second shaft fixing portions; and an elastic member provided between the second shaft fixing portion and the second rotation shaft and configured to provide a restoring force to the flap.

4. The structure of claim 3, wherein the first shaft fixing portion is fixed, by the first rotation shaft, to a bracket provided inside a door trim, and the second shaft fixing portion is rotatably provided on the flap by the second rotation shaft.

5. The structure of claim 3, wherein the first shaft fixing portion is fixed, by the first rotation shaft, to a hinge fixing part provided on a lower portion of an upper end of the installation hole, and the second shaft fixing portion is rotatably provided on the flap by the second rotation shaft.

6. The structure of claim 5, wherein the door trim flap links are provided at an equal interval in the installation hole.

7. The structure of claim 1, wherein the flap part further includes:

an installation hole positioned to face a center rail of the vehicle and elongated in a longitudinal direction of the center rail;

door trim flap links provided in the installation hole, wherein each of the door trim flap links includes first and second shaft fixing portions provided at first and second opposite ends thereof;

first and second rotation shafts rotatably provided on the first and second shaft fixing portions; and an elastic member provided between the second shaft fixing portion and the second rotation shaft and configured to provide a restoring force to the flap of the flap part.

8. The structure of claim 7, wherein the first shaft fixing portion is fixed, by the first rotation shaft, to a bracket provided inside a door trim, and the second shaft fixing portion is rotatably provided on the flap by the second rotation shaft.

9. The structure of claim 7, wherein the first shaft fixing portion is fixed, by the first rotation shaft, to a hinge fixing part provided on a lower portion of an upper end of the installation hole, and the second shaft fixing portion is rotatably provided on the flap by the second rotation shaft.

10. The structure of claim 9, wherein the door trim flap links are provided at an equal interval in the installation hole.

11. The structure of claim 1, wherein a center rail part is positioned on a door trim adjacent to the sliding door.

12. A structure of a flap part for covering a rail part when opening a sliding door of a vehicle, the structure comprising:

the flap part including a flap for covering the rail part;

a roller arm; and a door flap guide, wherein the rail part, which is externally exposed when the sliding door is opened, is covered by the flap part, and wherein the door flap guide includes an inclined surface at one end portion of the door flap guide, and the inclined surface is configured to be engaged with the roller arm and the flap is opened when the roller arm pushes the inclined surface at a time of opening the sliding door, to ensure a movement space for the roller arm.

13. The structure of claim 12, wherein the flap part includes:

an installation hole positioned to face a center rail of the vehicle and elongated in a longitudinal direction of the center rail;

at least a door trim flap link provided in the installation hole and, wherein the at least a door trim flap link includes first and second shaft fixing portions provided at first and second opposite ends thereof;

first and second rotation shafts rotatably provided on the first and second shaft fixing portions; and an elastic member provided between the second shaft fixing portion and the second rotation shaft and configured to provide a restoring force to the flap.

14. The structure of claim 13, wherein the first shaft fixing portion is fixed, by the first rotation shaft, to a bracket provided inside a door trim, and the second shaft fixing portion is rotatably provided on the flap by the second rotation shaft.

15. The structure of claim 13, wherein the first shaft fixing portion is fixed, by the first rotation shaft, to a hinge fixing part provided on a lower portion of an upper end of the installation hole, and the second shaft fixing portion is rotatably provided on the flap by the second rotation shaft.

16. The structure of claim 12, wherein a center rail part is positioned on a door trim adjacent to the sliding door.

* * * * *